March 2, 1971     A. G. BLANTON ET AL     3,566,591
COTTON HARVESTER WITH PNEUMATIC GREEN BOLL SEPARATOR
Filed March 21, 1968
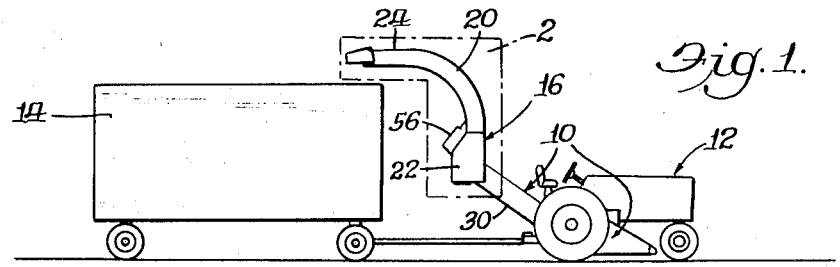
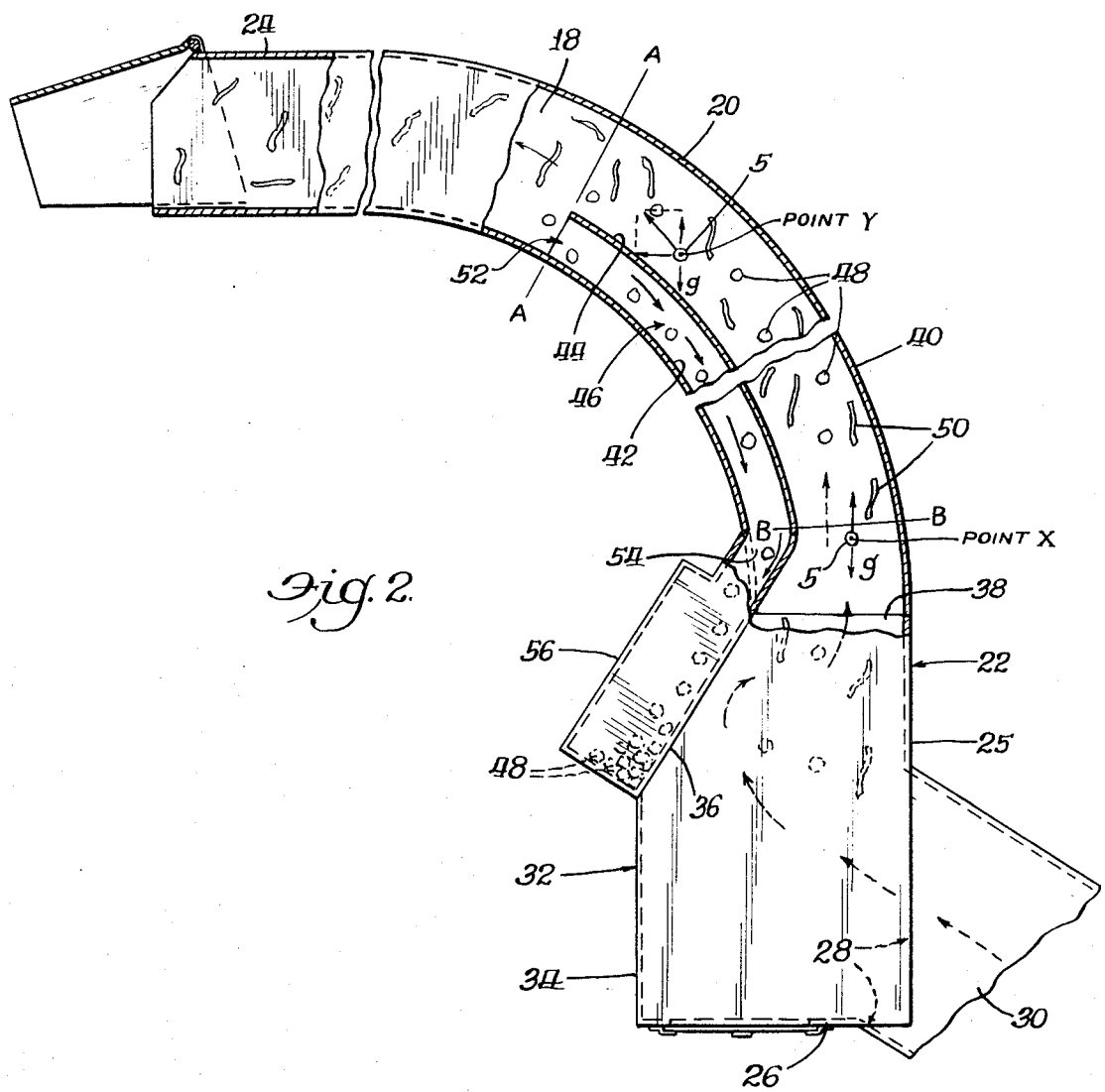
Inventors:
Albert Glenn Blanton
Wyatt T. Gable, Jr.
By John J. Kowacik
Atty.

ically a cotton harvester of the character to which the present invention is particularly adapted. In this figure, the cotton harvester referred to, which is in the form of a stripper, is indicated at 10, is drawn by a tractor 12 and itself draws a trailer or receptacle 14. It will be understood that the invention is equally applicable to constructions wherein the basket or receptacle is carried by the tractor.

United States Patent Office

3,566,591
Patented Mar. 2, 1971

3,566,591
COTTON HARVESTER WITH PNEUMATIC GREEN BOLL SEPARATOR
Albert G. Blanton and Wyatt T. Gable, Jr., Memphis, Tenn., assignors to International Harvester Company, Chicago, Ill.
Filed Mar. 21, 1968, Ser. No. 714,822
Int. Cl. A01d 45/20
U.S. Cl. 56—30                                  8 Claims

ABSTRACT OF THE DISCLOSURE

Cotton harvester incorporating a staged separator which includes a pneumatic delivery conduit having a curved segment or elbow through which an air stream is blown, and having a chute on the inside turn of the elbow which effectively reduces the cross-sectional area in that portion of the conduit producing a venturi effect, the attendant air stream charatceristics thereby conducing separation of the heavy green bolls which drop out of the main air stream and roll down the chute which segregates them.

BACKGROUND

The invention relates to cotton harvesters such as strippers, which harvest both lint cotton and green bolls, having a pneumatic system for carrying the cotton in an air stream from the stripper to a receptacle such as a trailer. Some of the green bolls, because of their greater weight and density, tend to recede and drop out of the main portion of the air stream and are collected, otherwise after a time they would accumulate within the air stream, impeding the travel of the lint cotton through the conduit. A certain proportion of the green bolls are nevertheless carried to the receptacle and it is necessary to separate them from the lint cotton that is so delivered to the receptacle which is presently done at the gin entailing a loss of the green bolls and an increase in cost of processing by the gin mill.

THE PRESENT INVENTION

The present invention relates to the broad field of eliminating the foregoing difficulty, and particularly to the phase thereof for separating the green bolls from the air stream and facilitating the flow of lint cotton through the pneumatic conduit to the receptacle.

The invention relates more particularly to an arrangement for utilizing the differential in air velocity created by a venturi effect in an air stream flowing around a conduit bend or elbow, in that toward the latter portion of the bend the internal cross-sectional area is suddenly increased and attendant to this increase a stream of lesser velocity is produced causing the heavier green bolls to drop out and work downwardly; the invention includes means for preventing them from again moving into the main portion of the air stream.

Another object is to provide an arrangement of the foregoing general character which includes a baffle construction on the inside curved surface of the elbow of the conduit for receiving the green bolls upon their dropping out of the main portion of the air stream and for segregating them from the air stream and confining them in a separate compartment.

A still further object of the invention is to provide an arrangement in which the green boll segregating baffle constructed on the inner curve portion of the conduit decreases the cross-sectional area in that portion of the conduit thereby producing the desired venturi effect.

Still another object is to provide an arrangement of the foregoing general character wherein the baffle means includes an inlet opening adjacent the upper end of the elbow where the velocity of the air stream is near a minimum for receiving the green bolls, and confines them in a channel in which they roll or slide downwardly to a receptacle free of any up-effect of the main portion of the air stream.

PREFERRED EMBODIMENT OF THE INVENTION

FIG. 1 shows diagrammatically a cotton harvester of the type to which the present invention is applicable, together with other implements; and
FIG. 2 is a vertical sectional view of that portion, indicated at 2 with parts broken away, of the arrangement shown in FIG. 1, and oriented according to FIG. 1.

Referring now in detail to the accompanying drawings, attention is directed first to FIG. 1 showing diagrammat- The stripper 10 is of the character that strips all of the cotton bolls from the plant, which include both lint cotton and green bolls and delivers them to a separator generally designated 16. The means for separating and delivering the lint cotton to the trailer 14 includes a conveyor delivering to the separator 16 and a blower (not shown) which produces an air stream, which passes through the separator 16 and blows the cotton to the trailer. The air stream is transmitted through a conduit or pipe 18, the conduit including a bend portion or elbow segment 20 leading from a lower separation chamber 22, and terminating in a terminal portion 24 which is adjacent the horizontal, for delivering the cotton into the trailer.

The conveying arrangement is effective for carrying all of the cotton bolls picked from the plants and delivering them to the separator. The blower acting through the separator wherein the lint cotton being, of course, lighter in weight and fluffy is more easily carried in the air stream to its ultimate destination, but the green bolls being much heavier and dense do not progress as readily with the air stream, but tend to recede, when possible, in opposition to the main effect of the air stream.

The construction of the present invention includes means incorporated in such a pneumatic conduit, and particularly incorporated in a bend portion thereof for varying the velocity of the air stream flowing through the conduit, and at a position where the velocity of the air stream is at a minimum for receiving the heavier green bolls and enabling them to roll or travel back into a receptacle positioned for that purpose.

FIG. 2 is a large scale vertical sectional view of that portion of the separating device enclosed in dot-dash lines of FIG. 1, indicated at 2, and oriented according to FIG. 1. The air stream flows angularly across the lower separation chamber 22 into the elbow 20 which mergingly curves into the substantially horizontal terminal portion 24. Thus the elbow 20 encompasses an extent similar to a quadrant and thus includes a substantial vertical component of direction of flow at its inlet transforming to a substantially horizontal component at its outlet which exhausts into the terminal portion 24. Generally, the sequence of travel is that the cotton bolls after being removed from the plants, are delivered through a space or channel, into the separation chamber 22, through the elbow 20 an into the terminal portion 24, and through that latter portion into the trailer 14.

More specifically, the lower primary separator chamber 22 comprises upwardly extending sides forming a box-like enclosure having a forward wall 25 and bottom wall 26 and having chute 30 connected to the lower portion of walls 25 and 26. Within the portion of 25 and 26 covered by the connection of the duct 30 there is provided opening 28 suitable to allow the air stream and cotton bolls carried by the air stream to pass from the duct 30 to the lower chamber 22. An aft wall generally designated 32 of the chamber 22 has a substantially vertical lower portion 34 and a forwardly inclining upper portion 36 which terminates at a substantially horizontal opening 38 which defines the top of chamber 22. The opening 38 due to the constricting characteristic of wall 36 has a cross-sectional area substantially less than the horizontal cross-section of the lower portion of the separation chamber 22.

It will be seen that connected to the top of chamber 22 and covering the opening 38 is the arcuate, upward, and rearwardly extending duct 18 which has an initial shape complementary to opening 38. The lower curved segment 20 of duct 18 having its inlet connected to the chamber 22 in the manner heretofore described has its upper discharge end connected to the substantially horizontal tailpiece 24.

The novel and unique design of elbow 20 which embodies the upper secondary stage of separation is shown in the cut-away portion of FIG. 2. The elbow 20 comprises an outer forward wall 40 which curves upwardly and aft, and an inner rear wall 42 generally concentric to the forward wall 40. Now constructed intermediate the walls 40 and 42 and substantially concentric to them is internal baffle wall 44 forming a passage 46 which is out of the main air stream and of suitable dimensions so that green bolls 48, as they are separated from lint bolls 50, can roll downwardly on the inner wall 42 through upper baffle opening 52 into the passage 46 and out lower baffle opening 54 into a receptacle 56. It should be noted that baffle wall 44 begins at a point partially up elbow 20 at line A—A and extends downward remaining substantially parallel to the outer and inner walls 40 and 42 respectively to line B—B where it angles in an aft direction becoming co-planar and connecting with the upper inclining wall 36 of said chamber 22. It can be further seen that the lower separator 22 and the conduit 18 form an air passage whose cross-sectional area is greater at lower end of chamber 22 and progressively decreases to a minimum at line B—B near the entrance of elbow 20 where it remains substantially constant up to line A—A; here baffle wall 44 terminates causing a sudden increase in cross-sectional area which thereafter remains substantially the same throughout the remaining portion of elbow 20 and tail piece 24.

A novel feature of the invention is found in that the stages of separation in combination create air flow characteristics which, when operating in conjunction with internal design, result in an efficient separation notwithstanding normal fluctuations of blower fan speed or material input. The cotton stripper 10 has means to remove both the green cotton bolls 48 and the lint bolls 50 from the plant and introduce them into an air stream of suitable quantity and velocity produced by the blower fan. The air stream transports the bolls through the chute 30 and enters the forward lower portion of the separation chamber 22 in an upward and rearward direction. The material transverses the chamber 22 and collides with inclining wall 36 at an angle substantially normal to the direction of travel resulting in sufficient loss of momentum of some of the heavier green bolls which drop out of the air stream and are separated. The remaining mixture of green and lint bolls is deflectively driven upward into the entrance of elbow 20. It can be seen from FIG. 2 that as the material progresses toward the entrance of elbow 20 the cross-sectional area of the air passage decreases and attendant this decrease the velocity of the air stream rapidly increases reaching a maximum between lines B—B and A—A thus assuring there will be the requisite force to carry the green bolls 48 into the second stage of separation and ultimately the lint cotton 50 to the trailer 14.

The secondary separation effected in elbow 20 is best explained by following a typical green boll 5 as it progresses through the secondary separator. At point X near line B—B the direction of the air stream is substantially vertical thereby exerting an upward force on the boll 5 which greater than, and in opposition to, the coactive, downward force of gravity 9. Further up the bend at point Y it is observed that the air stream force acting upon the boll 5 is no longer vertical but has a direction substantially tangent to the curvature at that point. Therefore, as the bolls 5 travel up the elbow the resultant propelling force acting upon it is composed of an increasing horizontal component and an ever decreasing vertical component. Now, as the vertical component shrinks the green bolls 48 because of their greater weight and density and being subject to the constant downward gravity force $g$ tend to lag and migrate toward the inner portion of elbow 20. As they pass line A—A the velocity of the air stream driving them suddenly decreases due to the abrupt increase in the cross-sectional air of the air passage caused by the termination of baffle wall 44. Attendant this sudden decrease of air stream velocity the vertical force component is likewise diminished to a value small compared with the downward gravity force $g$ acting on the green bolls thereby causing them to rapidly fall upon and roll down on the inner wall 42 into the upper baffle opening 52, downward out of the main air stream through the passage 46 into the receptacle 56. Meanwhile, although the air stream has been reduced beyond line A—A, as heretofore described, it is of suficient magnitude to amply carry the remaining lint cotton through tailpiece 24 to trailer 14.

It should be understood that one of the principle underlying reasons that the two stage separator 16 will operate efficiently under normal fluctuating field conditions is that the relative velocity boost from the first to the second stage is a function of the decrease in cross sectional areas between the stages and is elementally inherent in the design thus providing a means for increasing velocity from the primary to secondary stage relatively independent of external factors. It should be further noted that this design is ingeniously accomplished by constructing a partition wall such that it not only provides the desired construction, but also serves as a collecting chute for the green bolls thereby keeping them out of the main air stream during collection and interfering with incoming material thus reducing separation efficiency.

Having described the preferred form of the invention it will be readily apparent that various other embodiments of the invention will become obvious within the scope of the foregoing disclosure and within the scope of the appended claims.

What is claimed is:

1. In a cotton harvester having picking devices for removing an aggregate of green bolls and lint cotton from cotton plants, the improvement comprising a separator including: an elongated duct; conveyor means communicating with the lower portion of said duct and operative for producing therethrough an air stream having entrained therein a mixture of lint cotton and green bolls of said picking devices; baffle means defining with said duct first and second parallel passages extending longitudinally along an interior portion of the duct downstream of said conveyor means; said first passage conductively communicating with said conveyor means and providing an elongated constriction of said duct along said portion thereof; said second passage operative for passing green bolls downwardly within said duct out of the effects of said air stream; and said baffle means having an upper terminal end within said duct producing an abrupt dilation thereof and defining an opening into said second passage thereat, said dilation effecting a substantial decrease in air stream propelling force immediately downstream thereof to conduce a dropping of the green bolls which pass through said opening into said second passage.

2. The invention as recited in claim 1 wherein said duct includes an aperture communicating with said second passage and the outside of said duct, and means for collecting said separated green bolls conductively communicating with said aperture.

3. The invention as recited in claim 1 wherein said duct comprises forward and rear curved wall portions arranged in parallel disposition to each other; said baffle means comprising a partition interposed in substantial parallelism between said upper and lower wall portions with said first and second passages being defined by the space between said partition and said forward and rear wall portions respectively, said partition forming a closed lower end portion to said second passage; and said duct having an aperture disposed adjacent said end portion to provide a green boll exit from said second passage to the outside of said duct.

4. The invention as recited in claim 3 wherein said separator includes a green boll collection receptacle mounted on said harvester in green boll receiving relation to said aperture.

5. In a field going cotton harvester having means for indiscriminately harvesting an aggregate including green cotton bolls and lint cotton, the improvement comprising in combination a first and second separator:

said first separator comprising a chamber having an inlet and outlet and defining an air passage therebetween, means in aggregate receiving relation with said harvesting means and communicating with said inlet, said means operative for producing an air stream through said chamber having entrained therein said aggregate, deflecting means disposed within said chamber in deflecting and colliding relation with said aggregate for creating a loss of momentum of heavier green bolls to induce their separation from said air stream; said second separator comprising, an inclined duct conductively connected at one end thereof to said outlet of said first separator, baffle means defining with said duct first and second parallel passages extending longitudinally along an interior portion of said duct, said first passage conductively communicating with said air passage of the first separator, said second passage operative for passing green bolls downwardly within said duct out of the effects of said air stream, and said baffle means having an upper terminal end within said duct producing an abrupt dilation of said duct and defining an opening into said second passage thereat, said dilation effecting a substantial decrease in air stream propelling force immediately downstream of the terminal end to conduce a dropping of remaining airborne green bolls from the air stream to pass through said opening and enter said second passage.

6. The invention as recited in claim 5 wherein said deflecting means comprises an inclined wall disposed athwart the flow of said air entrained aggregate to produce a funneling effect into said first passage of said second separator.

7. The invention as recited in claim 6 wherein said chamber of the first separator includes a closable opening disposed below said wall for removing green bolls from said chamber, and said duct includes an aperture communicating with said second passage and the outside of said duct to provide an exit for green bolls passing through said second passage.

8. The invention as recited in claim 6 wherein said duct comprises forward and rear curved wall portions arranged in parallel disposition to each other; said baffle means comprising a partition interposed in substantial parallelism between said forward and rear wall portions wherein said first and second passages being defined by the space between said partition and said forward and rear wall portions respectively, said partition forming a closed lower end portion at said second passage; said duct having an aperture disposed adjacent said end portion to provide a green boll exit from said second passage to the outside of said duct, and means mounted on said harvester in green boll receiving relation to said aperture for collecting separated green bolls passing through said second passage.

References Cited

UNITED STATES PATENTS

| | | | |
|---|---|---|---|
| 2,499,037 | 2/1950 | Roles | 209—136 |
| 2,502,817 | 4/1950 | Bennett | 56—12 |
| 2,820,989 | 1/1958 | Bopf | 209—137 |
| 2,861,298 | 11/1958 | Fowler | 209—137 |
| 3,035,312 | 5/1962 | Cox | 56—12X |
| 3,123,963 | 3/1964 | Horton et al. | 56—33 |
| 3,278,026 | 10/1966 | Bishard | 209—133 |
| 3,312,343 | 4/1967 | Elder et al. | 209—139 |
| 3,372,535 | 3/1968 | McCunn et al. | 56—12 |
| 3,397,522 | 8/1968 | Sanderson et al. | 56—30 |
| 3,441,131 | 4/1969 | Gebauer | 209—139X |

RUSSELL R. KINSEY, Primary Examiner

U.S. Cl. X.R.

209—139